March 30, 1948. H. FORSTER 2,438,849
PISTON WRIST PIN CARRIER
Filed March 8, 1946
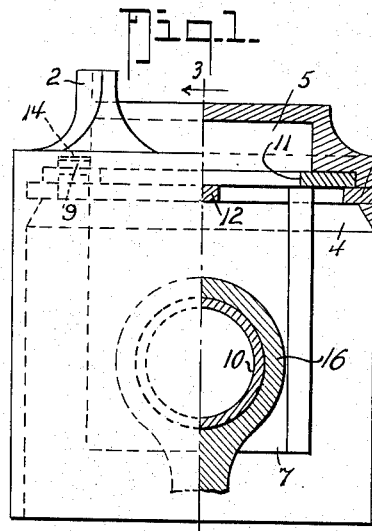
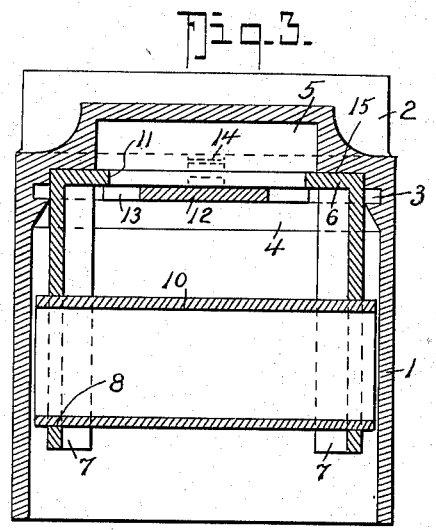
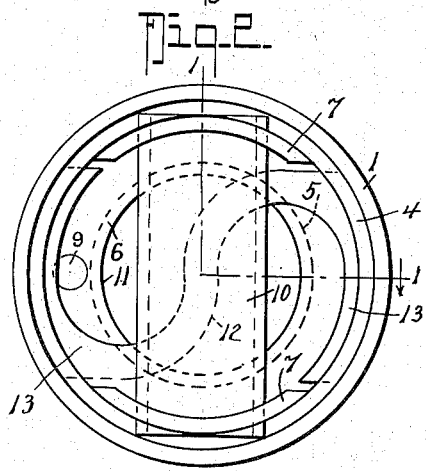
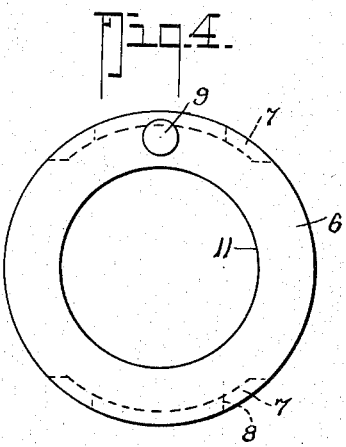
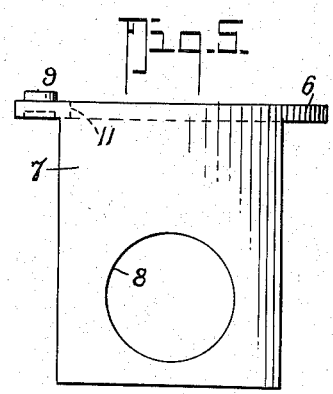
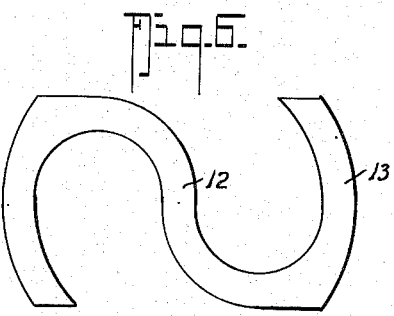
INVENTOR,
Henry Forster,
BY
Albert E. Dieterich,
ATTORNEY.

Patented Mar. 30, 1948

2,438,849

UNITED STATES PATENT OFFICE 2,438,849

PISTON WRIST PIN CARRIER

Henry Forster, Broadview, Ill.

Application March 8, 1946, Serial No. 652,883

4 Claims. (Cl. 309—19)

My invention relates principally to pistons for use in model internal combustion engines and it has for its objects 1. To provide a piston which has a continuous sealing surface unbroken by wrist pin holes.
2. To provide a piston wherein no wrist pin lock is required.
3. To provide a piston by the use of which cylinder scoring due to failure of wrist-pin locking devices is eliminated.
4. To provide a piston which when worn need not entirely be discarded but the outer shell only need be renewed.
5. To provide a piston which, due to uniform wall section of the outer shell and its freedom from wrist pin holes, is stronger and subject to less distortion under changing thermal conditions during the operation of the engine, than the pistons now commonly used.
6. To provide a piston with a wrist pin carrier which will allow the maximum width of connecting rod bearing.
7. To provide a piston, in which the construction of the inner surface of the piston shell is such that no special tools are required to seat the spring retainer or to disassemble the parts.

Other objects will be in part obvious and in part be pointed out hereinafter.

To the attainment of the aforesaid objects and ends invention further resides in those novel details of construction, combinations, and arrangements of parts all of which will be first fully described hereinafter and then be specifically pointed out in the appended claims, reference being had to the accompanying drawing in which:

Fig. 1 is a part elevation and part section on the line 1—1 of Fig. 2.

Fig. 2 is a bottom plan view of the same.

Fig. 3 is a vertical section on the line 3—3 of Fig. 1.

Fig. 4 is a top plan view of the wrist pin carrier.

Fig. 5 is a side elevation of the same.

Fig. 6 is a plan view of the spring retainer.

In the drawing, in which like numerals of reference indicate like parts in all the figures, 1 is the piston shell the top of which is crowned and provided with a gas baffle 2 and an internal recess 5. The shell 1 also has a seat 15 against which the top 6 of the wrist pin carrier fits. The shell also has a groove 3 to receive the spring retainer portions 13, and a bevelled portion 4 for a purpose presently made clear.

The wrist-pin carrier comprises a top 6 having a center opening 11 a centering boss 9 and legs 7, the latter being provided with holes 8 to receive a wrist pin 10. The boss 9 fits into a recess 14 in the seat 15 to hold the wrist-pin carrier against turning with respect to the piston shell and vice versa.

The spring retainer is of 8-shape and includes the locking segments 13, which lie in the groove 3, and the connecting portion 12 which lies across beneath the opening 11 of the wrist-pin carrier 6. The locking segments 13 are of a length to fit freely between the adjacent vertical edges of the legs 7 as best shown in Fig. 2.

To assemble the piston, the connecting rod 16 wrist pin and wrist pin carrier are first assembled. This assembly is then placed inside the piston shell, with the spring retainer loosely in place. The wrist-pin carrier is then properly seated, with due regard to the boss 9 and drilled recess 14, whereafter pressure is applied to the spring retainer which will be compressed by being forced over the bevelled ledge 4 until the locking segments become seated in the ring groove 3.

To disassemble the parts the spring retainer is unseated by grasping it with a wire hook (not shown) which clearance hole 5 will permit; by pulling on the hook the spring retainer may easily be dislodged.

From the foregoing description taken in connection with the accompanying drawing it is thought the construction, operation and advantages of my invention will be clear to those skilled in the art.

What I claim is:

1. A piston comprising a shell having a continuous skirt, an internal seat adjacent its top and an internal annular groove adjacent said seat; a wrist-pin carrier having a top to fit into said seat and having diametrically opposed legs, the latter having wrist-pin holes; and a spring retainer having locking segments for location in said annular groove and having a connecting portion extending between said legs and lying against and beneath the top of said wrist-pin carrier.

2. The piston of claim 1 wherein the shell has a bevelled surface adjacent said annular groove for purposes described.

3. A piston comprising a shell having a internally recessed top and a wrist-pin-carrier-receiving seat and having a continuous un-interrupted skirt located next to said seat and having an internal annular groove and a bevelled surface entrance to said groove; a wrist-pin carrier having a top to fit within said shell against said seat and having an opening in its top and having wrist-pin-carrying legs; a wrist pin mounted in said legs; and a spring retainer of S-shape having locking segments fitted into said groove to hold said wrist-pin carrier in place.

4. The piston of claim 3 wherein means are provided to prevent relative rotation between said shell and said wrist-pin carrier about their common axis.

HENRY FORSTER.

REFERENCES CITED

The following references are of record in the file of this patent:

UNITED STATES PATENTS

| Number | Name | Date |
|---|---|---|
| 1,076,326 | Strite | Oct. 21, 1913 |

FOREIGN PATENTS

| Number | Country | Date |
|---|---|---|
| 370,267 | England | 1931 |
| 400,492 | England | 1933 |